United States Patent

[11] 3,603,437

| [72] | Inventor | Glenn S. Spencer |
| | | Big Flats, N.Y. |
| [21] | Appl. No. | 44,300 |
| [22] | Filed | June 8, 1970 |
| [45] | Patented | Sept. 7, 1971 |
| [73] | Assignee | The Bendix Corporation |

[54] POSITIVE POSITION BRAKE-CLUTCH
17 Claims, 6 Drawing Figs.

[52] U.S. Cl. .................................................. 192/53 D,
188/82.3, 188/156, 188/164, 192/53 B, 192/67 R,
192/84 A, 192/84 PM, 192/108, 192/148
[51] Int. Cl. ...................................................... F16d 27/04,
F16d 43/26, F16d 65/16
[50] Field of Search............................................ 192/46, 52,
53 D, 53 B, 53 F, 84 R, 84 A, 84 C, 84 PM, 18 B,
67 R, 108, 148; 188/69, 82.1, 82.3, 156, 161, 163,
164

[56] References Cited
UNITED STATES PATENTS

| 78,245 | 5/1968 | Weiland ........................ | 192/46 |
| 479,192 | 7/1892 | Leedle........................... | 192/46 |
| 2,042,514 | 6/1936 | Diebold......................... | 192/53 B |
| 2,061,220 | 11/1936 | Cotterman ..................... | 192/46 |
| 2,129,847 | 9/1938 | Knodel.......................... | 192/84 P |
| 2,803,323 | 8/1957 | Newell .......................... | 192/84 C (X) |
| 2,969,134 | 1/1961 | Wiedman et al. ............. | 192/108 X |

FOREIGN PATENTS

| 140,868 | 6/1953 | Sweden......................... | 192/84 P |

*Primary Examiner* — Allan D. Herrmann
*Attorneys* — Robert A. Benziger and Plante, Hartz, Smith and Thompson ABSTRACT: A pair of members have opposed spiral surfaces formed about an axis and surfaces connecting the ends of each spiral surface to form stops. The spiral surfaces are energy-absorbing surfaces and are urged apart by spring means. The members are relatively rotatable about the axis and relatively movable along the axis. One of said members has disposed therein an annular magnet having a flux path through the members and across a space therebetween. Synchronizing means activates the magnet when there is a specified angular relationship between the surfaces so that the magnet provides flux that draws the surfaces into contact over a small area which increases with relative rotation, thereby increasing the magnetic force between the surfaces and the energy absorbed by the relatively rotating surfaces to slow the relative rotation before the stops engage at a predetermined angular relationship.

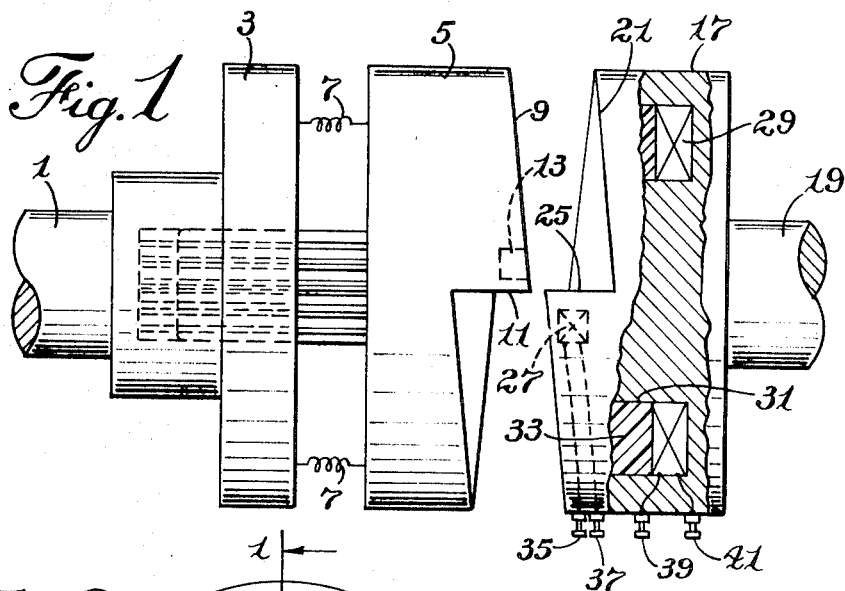
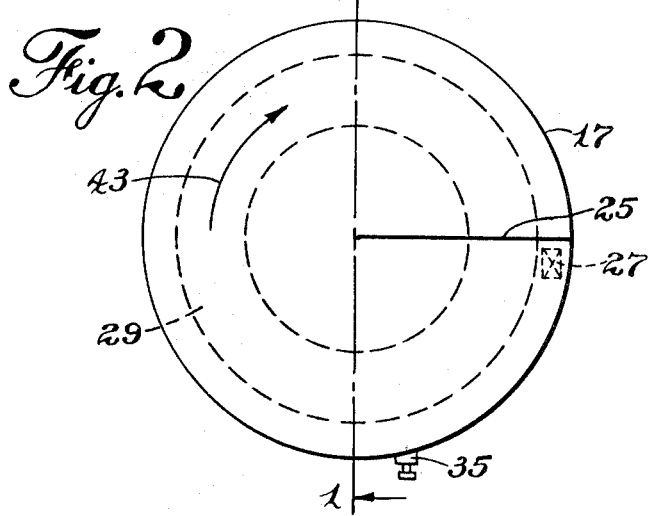
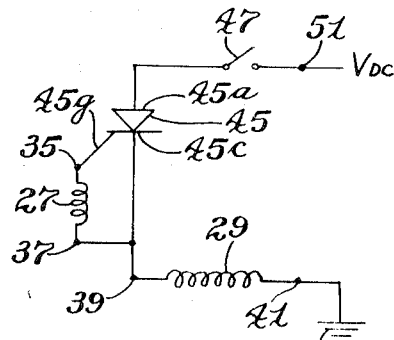
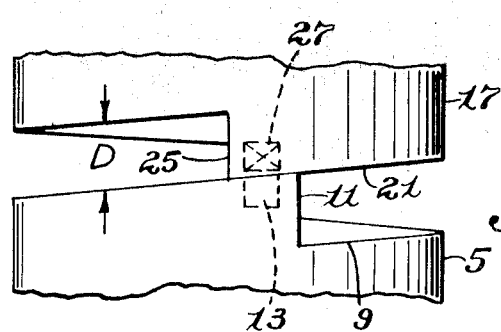

3,603,437

POSITIVE POSITION BRAKE-CLUTCH

BACKGROUND OF THE INVENTION

1. Field of the Invention

This invention relates to electromagnetic devices and more particularly to a device for engaging relatively rotating members at a predetermined angular relationship.

2. Description of the Prior Art

Heretofore, magnetic brakes and clutches have been designed in one of two ways. Firstly, there were devices of this type that did not provide a positive engagement position. In devices of this type two members having relative rotation and opposing surfaces were magnetically drawn together to provide a braking torque and and absorb the kinetic energy of one of the members thereby slowing the member to zero relative rotation. This type of device has the advantage of providing an even deceleration but did not provide a positive position of engagement.

Secondly, there were devices that provided positive engagement positions but did not provide means for absorbing kinetic energy prior to engagement. In such devices relatively rotating members were magnetically drawn together causing the engagement of stops and an immediate cessation of the relative rotation. While these devices provided a positive engagement position they were required to withstand large forces from the rapid deceleration of the relative rotation.

SUMMARY OF THE INVENTION

The present invention contemplates two members relatively rotatable about an axis, the members being relatively movable along the axis. The members have opposed single turn spiral surfaces, the ends of each spiral surface being connected by a plane surface forming a stop. The surfaces are designed to be energy absorbing and are urged apart by spring means. One of said members has an electromagnetic coil mounted therein having a flux path through both members and across a space between the members.

A synchronizing means applies power to the electromagnetic coil upon coincidence of an activation command and a specified angular relationship between the two members. This specified angular relationship is generally an angular position just beyond a position where the stops are opposed.

When the coil is activated the surfaces of the members are drawn together and contact each other over a small area with a certain magnetic force and the energy absorption between the surfaces provides a braking torque to slow the relative rotation between the members. As the relative rotation continues, the area between the surfaces increases thereby increasing the magnetic force between the surfaces and the braking torque. Thus much of the kinetic energy of the relatively rotating member is absorbed prior to engagement of the stops at the positive position.

One object of the present invention is to provide a positive position brake or clutch having minimum shock and rebound at the desired engagement position.

Another object of the invention is to provide a positive position brake or clutch that absorbs a considerable amount of kinetic energy before the positive position is reached.

Another object of the invention is to provide an electromagnetic brake of clutch that has increasing energy absorption prior to positive engagement.

DESCRIPTION OF THE DRAWINGS

FIG. 1 is a partial section of an electromagnetic clutch or brake constructed in accordance with the present invention.

FIG. 2 is a plan view of the spiral surface of a stationary member of FIG. 1.

FIG. 3 is a fragmentary development of the members of the clutch or brake of FIG. 1.

FIG. 4 is a schematic diagram of the electrical components used in the present invention.

DESCRIPTION OF THE INVENTION

Figure 5:
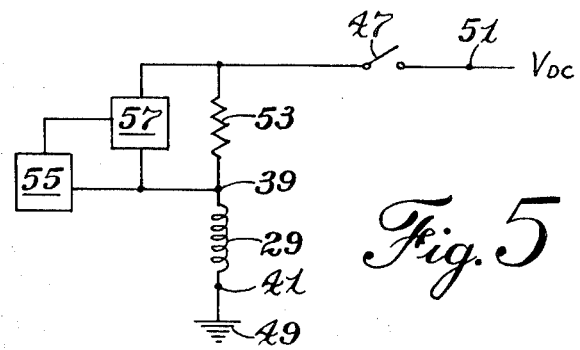
FIG. 5 is a schematic diagram of another embodiment of the electronic components of the present invention.

Referring to FIG. 1 there is shown a preferred embodiment of an electromagnetic clutch or brake constructed in accordance with the present invention. For convenience, the present invention will be described as a brake. A rotatable shaft 1 has a circular flange 3 concentrically mounted on an end thereof. A first member 5 constructed of magnetic material is slidably splined into a recess formed in shaft 1 and flange 3 for rotation by shaft 1 about an axis of shaft 1. Member 5 has a single revolution energy absorbing spiral surface 9 formed about the rotation axis. Said surface may be bare iron or may be coated with magnetic particles such as sintered iron. The ends of surface 9 are connected by a surface 11 forming a stop. The overall surface may be described as having a ramp portion and a step portion. A small permanent magnet 13 is disposed beneath surface 9 and near the edge thereof.

A member 17 constructed of magnetic material is mounted coaxially on a stationary shaft 19 which is in axial alignment with shaft 1. Member 17 has a single revolution spiral surface 21 of bare iron or coated with magnetic particles such as sintered iron. Surface 21 is juxtaposed with surface 9 of member 5. The ends of spiral surface 21 are connected by a surface 25 forming a stop. Springs 7 are mounted in tension between flange 3 and member 5 to urge member 5 towards flange 3 and to maintain a space between surfaces 9 and 21.

A small detection coil 27 is disposed beneath surface 21 so that the coil passes opposite permanent magnet 13. An annular solenoid or electromagnetic coil 29 is disposed in a circular groove 31 formed in surface 21 and coaxial with the rotation axis of shaft 1. Coil 29 is retained within groove 31 by a potting material 33. Detection coil 27 has two electrical leads connected to terminals 35 and 37 mounted on member 17 and coil 29 has two leads connected to terminals 39 and 41 mounted on member 17.

Referring to FIG. 2 there is shown the position of detection coil 27 beneath surface 21. Arrow 43 shows the relative direction of the rotation of member 5.

Referring to FIG. 4 there is shown a silicon controlled rectifier 45 connected in series with coil 29 and a switch 47. Terminal 35 which is connected to one lead of detection coil 27 is also connected to a gate element 45g of silicon-controlled rectifier 45 and the other lead of coil 27 is connected by terminal 37 to a cathode element 45c of silicon controlled rectifier 45. Silicon-controlled rectifier 45 has an anode element 45a connected to switch 47 for connecting the anode element to a terminal 51 which has a positive DC voltage supplied thereto. Terminal 41 is connected to a ground 49.

In operation, when it is desirable to stop the rotation of shaft 1 switch 47 is closed. At this time member 5 will continue to rotate until detection coil 27 passes permanent magnet 13 at which point there will be induced a voltage in detection coil 27 sufficient to trigger silicon controlled rectifier 45 into a conductive state thereby applying the DC voltage to coil 29 which activates the brake. Thus, the relative angular position at which the brake engages in determined by the location of magnet 13 and coil 27.

Coil 29 establishes a magnetic flux across the space between members 5 and 17 and through member 5 which draws member 5 which draws member 5 towards member 17 so that surfaces 9 and 21 come in contact at a position substantially as shown in FIG. 3 with only a small segment of the surfaces 9 and 21 in contact.

Friction at the interface of surfaces 9 and 21 produces a braking torque on rotating member 5 that is proportional to the magnetic force between members 5 and 17. The magnetic force equals $KB^2_1 A_1 + KB^2_2 A_2$ where K is a constant, $A_1$ is the area of surfaces 9 and 21 that are in contact and $B_1$ is the flux density therebetween and $A_2$ is the area of surfaces 9 and 21 that are not in contact and $B_2$ is the flux density therebetween. As rotation continues the distance D between the noncontacting area remains constant therefore both $B_1$ and $B_2$ remain constant with $B_1$ being considerably greater than $B_2$ due to there being no airgap in the magnetic circuit crossing area $A_1$. If contact is made with $A_1$ at a minimum, the initial engagement force is approximately:

$$F_i = KB^2_1 A_1 + KB^2_2 A_2 \quad (1)$$
$$= 0 + KB^2_2 A_2 \quad (2)$$
$$= KB^2_2 A_T \quad (3)$$

Where $A_T$ equals the total area of the spiral surface.
The final force, before hitting the stop is approximately:

$$F_f = KB^2_1 A_1 + KB^2_2 A_2 \quad (4)$$
$$= KB^2_1 A_1 + 0 \quad (5)$$
$$= KB^2_1 A_T \quad (6)$$

While $KB^2_2 A_2$ grows smaller, $KB^2_1 A_1$ grows larger. The clamping force grows from $F_i$ to $F_f$ linearly with rotation. Since $A_1$ is initially small the braking torque exerted on the rotating member increases linearly with rotation and acts like a shock absorber to dissipate most of the kinetic energy of rotating member 5 before stop 11 makes contact with stop 25 at a positive position. The dissipation of kinetic energy reduces both the shock exerted on stops 11 and 25 and also rebound after the stops engage. The helix angle of the spiral surfaces also tends to discourage rebound.

Upon opening of switch 47 the magnetic field provided by coil 29 collapses releasing member 5 which slides back into shaft 1 and flange 3 under the tension exerted by springs 7.

The above described embodiment of the invention is a brake wherein member 17 is fixed to a stationary shaft; however, shaft 19 could be rotatable and driven by shaft 1 wherein the embodiment would then be a clutch that imparts kinetic energy to the driven member prior to engagement at a positive angular position.

The preferred embodiment as shown has only one stop position and utilizes a full 360 degrees of rotation to absorb kinetic energy at an increasing rate and to slow the rotating member prior to engagement of the stops. If two or more stopping positions are desired the spiral surfaces maybe equally segmented each segment being offset along the axis from the adjacent segment by a distance equal to the pitch of the segment. In such an embodiment the stops are formed by surfaces connecting adjacent spiral surfaces. Thus, the members may have several ramp portions and several stop portions.

If it is not desirable to have the torque increase then the invention can be practiced with any two mating surfaces which need not be of equal area or subtend equal angles. The stops may be provided by mounting a pin on one surface that rides in a semicircular groove in the mating surface or along the edge thereof and engages when the end of the groove or a projection from the edge is reached to provide the positive position stop.

If increasing torque is desirable then single turn spiral surfaces are preferred because they allow for increasing braking torque for any value of rotation up to a full 360° prior to stop engagement. However, increasing torque may be provided by using any shaped mating surfaces that subtend angles of 180° or less. In such an arrangement the coil is activated when a small segment of the mating surface are opposed and the stops are positioned to engage when the maximum area of contact is reached. In such an arrangement the contact area increases linearly with rotation thereby increasing the magnetic force and braking torque until the stops engage but the maximum usable angle for continuously increasing torque is 180° of increasing torque. In addition, dissimilar surface configurations may also be used.

Figure 6:
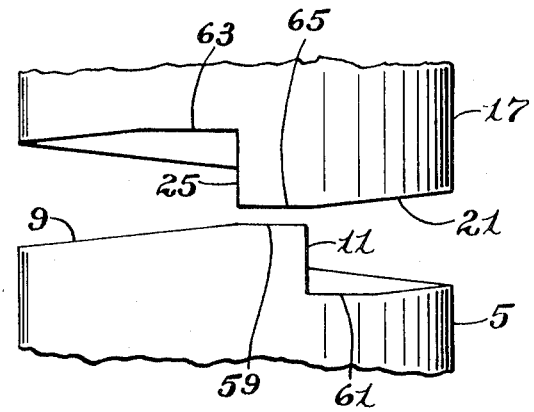
FIG. 6 is a fragmentary development of another embodiment of the members of the clutch or brake of FIG. 1.

The invention is not limited to the particular synchronizing means shown. Other forms of switch means and proximity sensors could be used to achieve the same result. FIGS. 5 and 6 illustrate alternate synchronizing means for use with the invention.

Referring to FIG. 5 there is shown a synchronizing circuit for use with an embodiment as shown in FIG. 1. Coil 29 is connected in series with a resistor 53 and switch 47. As in FIG. 4, terminal 51 is connected to switch 47 and to a DC voltage source and terminal 41 is connected to ground 49. Resistors 53 limits the energization of coil 29 to a level too low to attract members 5 and 17; however, the flux will vary greatly as the high points of the spiral surfaces pass each other thereby producing a pulse in the current passing through the coil A pulse detector 55 is connected to terminal 39 to detect when the high points of the spiral surface pass each other. The pulse detector in response to a pulse provides energization for a relay 57 connected across resistor 53 so that relay 57 when energized shorts out resistor 53 and coil 29 is fully energized to attract members 5 and 17.

Referring to FIG. 6 there is shown an embodiment of the invention that does not require synchronizing circuitry. In the embodiment of FIG. 6 the ends of spiral surface 9 have flat spots 59 and 61 and the ends of spiral surface 21 have flat spots 63 and 65 formed as shown. In this embodiment coil energization is established at a level so that members 5 and 17 will only be attracted when flat spots 59 and 65 pass each other and the air gap is at a minimum. After the flat spots make initial contact the magnetic field becomes stronger and the members remain in contact. As the area of contact between the spiral surfaces increases the braking torque increases. In this embodiment only switch 47 is required to apply the DC voltage to the coil.

Thus the present invention provides a magnetic brake or clutch having a positive engagement position and means for absorbing kinetic energy prior to engagement of stops to minimize shock and rebound. The device provides for increasing application of braking torque or clutching torque to achieve a smooth deceleration of a rotating member or a smooth acceleration of a driven member.

I claim:

1. A device for engaging, at predetermined angular relationships, members having relative rotation about an axis, comprising:
   a first magnetic member attached to one member and having a surface and stop means disposed at predetermined angles about the axis;
   a second magnetic member attached to the second member and having a surface contoured for mating with and juxtaposed to the surface of the first magnetic member and means for engaging the stop means, said magnetic members being mounted for relative lateral motion along the axis;
   means for urging the magnetic members apart so that the surfaces thereof are spaced and do not make contact during rotation;
   an electromagnetic device having a flux path passing through the magnetic members and across the space therebetween; and
   means for activating the electromagnetic device to generate magnetic flux through the flux path, said flux drawing the spaced surfaces into contact whereby a torque is exerted on the members to slow relative rotation prior to engagement of the stop means at a predetermined angular relationship.

2. A device as described in claim 1 wherein the activating means includes means for synchronizing activation with the relative angular relationship of the members so that the torque is exerted over a preselected rotation prior to engagement of the stop means.

3. A device as described in claim 1 wherein the surfaces are formed and arranged so that only a portion of each surface makes contact when the electromagnetic device is activated and the portion making contact increases with relative rotation thereby increasing the torque.

4. A device as described in claim 3 wherein the stop means are disposed at positions to engage when the surface contact is at a maximum, whereby the torque continuously increases during relative rotation.

5. A device as described in claim 1 wherein one of the members is nonrotatable, and the device functions as a brake to stop rotation of the other member at a predetermined angular position.

6. A device as described in claim 5 wherein the magnetic member attached to the rotatable member is mounted for motion along the axis and the other magnetic member is axially stationary.

7. A device as described in claim 1 wherein one of the magnetic members is slidably splined to the associated member.

8. A device as described in claim 1 wherein the means for activating the electromagnetic device comprises:
   switch means for connecting a power source to the electromagnetic device; and
   synchronizing means for activating the electromagnetic device when a predetermined angular relationship exists between the members.

9. A device as described in claim 8 wherein the synchronizing means comprises:
   detection means for detecting when the predetermined angular relationship exists between the members; and
   electronic switch means responsive to the detection means for allowing current from the power source to pass through the electromagnetic device.

10. A device as described in claim 1 wherein the mating surface of each magnetic member is a spiral surface formed about the axis, said surfaces having identical helix angles.

11. A device as described in claim 10 wherein the spiral surface of each magnetic member has ends at predetermined angular positions, and the stop means and means for engaging the same comprise surfaces connecting the ends of each spiral surface.

12. A device as described in claim 10 wherein the spiral surface is equally segmented and each segment is offset along the axis from the adjacent segment by an amount equal to the pitch of the segment.

13. A device as described in claim 12 wherein the adjacent segments of the spiral surfaces are connected by surfaces which form the stop means and the engaging means.

14. A device as described in claim 11 wherein the activating means include means for synchronizing activation with the relative angular relationship of the members so that the electromagnetic device is activated when a predetermined angular relationship exists between the members.

15. A device as described in claim 10 wherein the spiral surfaces have flat spots at the ends thereof and the activating means comprises a switch for connecting power to the electromagnetic device, the power being at a level so that the magnetic flux is sufficient to attract the magnetic members only when the flat spots of the surfaces are opposite each other.

16. A device as described in claim 10 wherein the activating means comprises:
   means for connecting a power source to the electromagnetic device;
   means for limiting the power applied to the electromagnetic device thereby limiting the current therethrough and the flux therefrom so that the magnetic members are not drawn together; and
   means for detecting current pulses produced when the ends of the spiral surfaces pass each other and for providing a signal when the pulses are detected, the limiting means being responsive to the signal to apply full power to the electromagnetic device.

17. A device as described in claim 1 wherein the juxtaposed surfaces have ramp portions and stop portions, the ramp portions being the surfaces and the stop portions forming the stop means and the means for engaging the same.